UNITED STATES PATENT OFFICE.

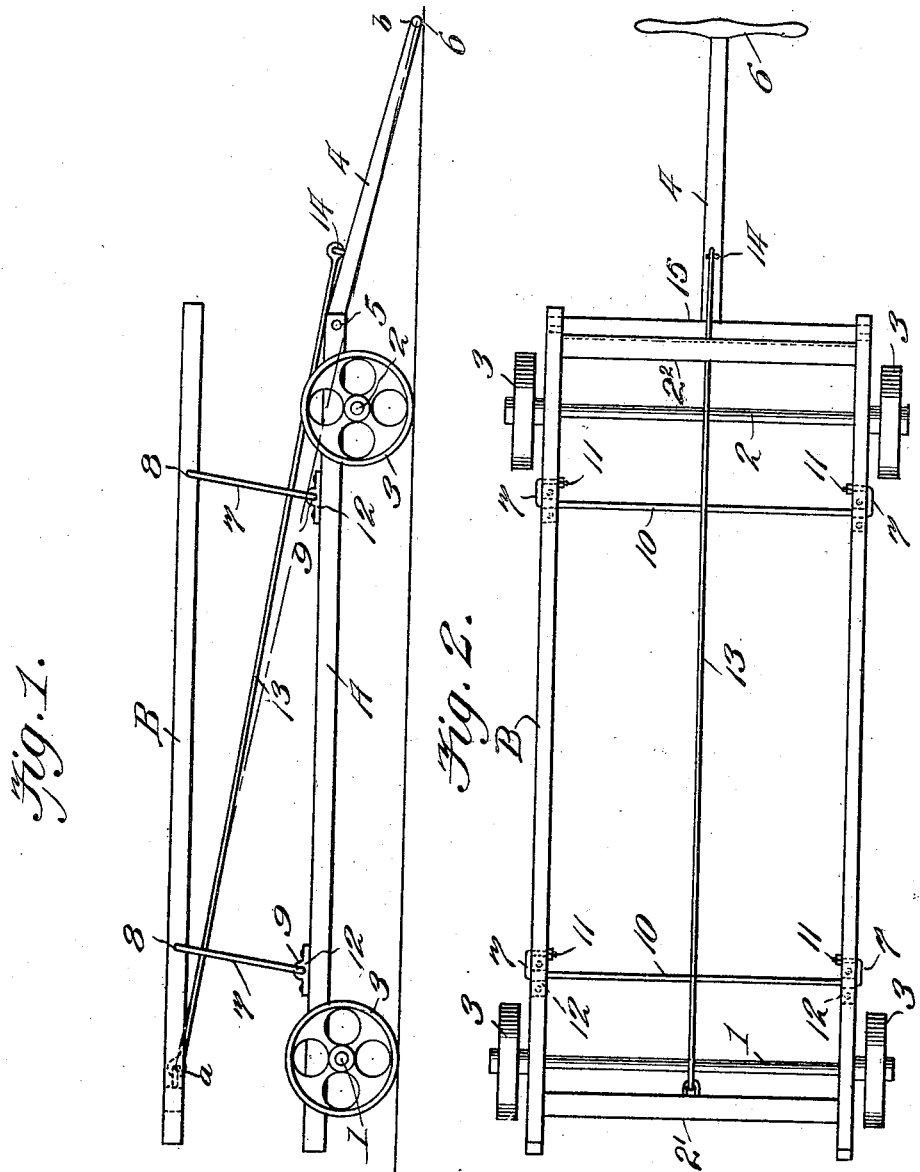

ALBERT P. COTTRELL, OF POMONA, MISSOURI.

LIFTING-JACK FOR VEHICLES.

No. 914,245.

Specification of Letters Patent.

Patented March 2, 1909.

Application filed October 5, 1907. Serial No. 396,066.

*To all whom it may concern:*

Be it known that I, ALBERT P. COTTRELL, a citizen of the United States, residing at Pomona, in the county of Howell and State of Missouri, have invented new and useful Improvements in Lifting-Jacks for Vehicles, of which the following is a specification.

This invention relates to a lifting jack for vehicles and relates more particularly to a combined lifting jack and truck.

The invention consists in the construction and arrangement of parts as will be hereinafter described and particularly pointed out in the claim.

In the accompanying drawing, which illustrates certain of the embodiments of the invention, Figure 1 is a side elevation of the combined jack and truck showing the platform in elevated position. Fig. 2 is a plan view thereof.

Similar reference characters are employed to designate corresponding parts throughout the several views.

Referring to the drawing A designates the frame or body of the device which is mounted on axles 1 and 2 that carry wheels 3 for permitting the combined jack and truck to be readily moved about.

Mounted on the truck or vehicle is a platform B of any approved design, the same consisting, in the present instance, of two longitudinal bars and two cross bars, and being adapted to be raised and lowered. For this purpose the platform is supported on links 7 that are pivotally connected to the platform at 8 and to the body A at 9. The links are arranged in pairs and each pair comprises a bar 10 which extends transversely to the body A and has its ends bent in right angles to form the links 7 the free extremity of the links being inwardly bent to form alining pintles 11 that bear in the openings 8 in the platform, the bar 10 being journaled near the links 7 in bearings 12 on the said body of the truck. By mounting the platform in this manner the latter can be raised or lowered by a curvilinear movement.

The platform B is provided with a front and a rear cross bar 2' and 2², having their opposite ends secured respectively to the platform. The front portion of the truck is provided with a rock-shaft 15 having its opposite ends pivoted in the side bars of the frame of the truck and to the central portion of the rock-shaft 15 one end of a tongue 4 is secured to the opposite end of the tongue having a handle 6 for operating the same. The platform is adapted to be raised by the manipulation of the tongue and to this end the tongue has one end of a rod pivoted thereto the opposite end of the rod being pivoted to the rear cross bar 2', whereby when the tongue is swung forwardly and downwardly the platform will be raised. The parts are so arranged and proportioned that when the tongue is fully depressed so that the free end will bear against the ground the platform will be locked in elevated position and is incapable of dropping forwardly or backwardly. The front end of the connecting rod 13 may be detachably connected with the tongue by a hook 14 so that by disconnecting the said rod from the tongue the device can be used solely as a truck, it being understood that the platform will rest flat on the body A. When the connecting rod is detached the tongue can be freely moved for enabling the truck to be wheeled about in carrying a load.

When the device is desired to be used as a lifting jack for raising a vehicle, the device is wheeled under the vehicle while the platform is in lowered position. When the device is in the proper relative position to enable the platform to engage one or both axles of the vehicle the tongue is swung forwardly and downwardly so as to raise the platform. When the platform is fully raised the links 7 are inclined forwardly from the vertical so that the platform tends to drop in a forward direction under the weight of the vehicle. This, however, is prevented by means of the tongue bearing on the ground. It will also be noted when the platform is fully elevated the tongue 4 and connecting rod 13 are disposed in such a manner that the point of connection between them, or the hook or fastening 14, is located right to one side of the line $a$, $b$, connecting the rear end of the said rod and front end of the tongue. It will thus be seen that the platform will be locked against a rearward movement. With a construction of the character described the movement of the tongue accomplishes the two-fold function of raising the platform and locking the same in raised position.

Having thus described the invention, what I claim is:—

A structure of the character described comprising an elevator mounted on a wheeled truck, a plurality of links pivotally connected to the truck frame and extending transversely across the same and bent vertically upward and having pintles thereon, a platform with side bars secured to said pintles, the side bars of the platform having a front and a rear cross bar secured thereto, a rockshaft having its opposite ends pivoted to the side bars of the truck frame, a straight rod of a length equal to the length of the side bars of the platform having one end hinged to the rear cross bar of the platform, the opposite end of said bar being detachably hinged to the tongue, and said tongue with the rod hinged thereto adapted to be swung forwardly and downwardly by means of said rock bar so as to raise the platform in an elevated position, the same being held in such position by means of lowering said tongue.

In testimony whereof I affix my signature in presence of two witnesses.

ALBERT P. COTTRELL.

Witnesses:
A. M. TOWNSEND,
R. H. BILLINGS.